(12) United States Patent
Hoezen et al.

(10) Patent No.: US 12,521,122 B2
(45) Date of Patent: Jan. 13, 2026

(54) TOURNIQUET AND FIRST AID KIT COMPRISING A TOURNIQUET

(71) Applicant: FIRST15 TRADING B.V., Kaatsheuvel (NL)

(72) Inventors: Peter Bernard Wouter Hoezen, Amsterdam (NL); Ronald Van Den Heuvel, Rijswijk (NL); Mitchell Van Der Wilt, Klundert (NL); Josephus Cornelis Theodorus Maria Verhoeven, Kaatsheuvel (NL)

(73) Assignee: First15 Trading B.V., Kaatsheuvel (NL)

( * ) Notice: Subject to any disclaimer, the term of this patent is extended or adjusted under 35 U.S.C. 154(b) by 0 days.

(21) Appl. No.: 18/708,265

(22) PCT Filed: Nov. 16, 2022

(86) PCT No.: PCT/NL2022/050656
§ 371 (c)(1),
(2) Date: May 8, 2024

(87) PCT Pub. No.: WO2023/091008
PCT Pub. Date: May 25, 2023

(65) Prior Publication Data
US 2024/0423639 A1    Dec. 26, 2024

(30) Foreign Application Priority Data

Nov. 17, 2021  (NL) ...................................... 2029784

(51) Int. Cl.
*A61B 17/132*     (2006.01)
*A61F 17/00*      (2006.01)
*A61B 17/00*      (2006.01)

(52) U.S. Cl.
CPC .......... *A61B 17/1327* (2013.01); *A61F 17/00* (2013.01); *A61B 2017/00862* (2013.01)

(58) Field of Classification Search
CPC ............ A61B 17/1322; A61B 17/1327; A61B 2017/00862; A61B 2090/0807; A61F 17/00
See application file for complete search history.

(56) References Cited

U.S. PATENT DOCUMENTS

| 3,086,529 A | 4/1963 | Munz et al. |
| 3,467,085 A | 9/1969 | Cormier |

(Continued)

FOREIGN PATENT DOCUMENTS

| CN | 201431489 Y | 3/2010 |
| CN | 202554031 U | 11/2012 |

(Continued)

*Primary Examiner* — William L Miller
(74) *Attorney, Agent, or Firm* — Ipsilon USA—NLO

(57) ABSTRACT

Provided herein is a tourniquet and first aid kit including a tourniquet. The tourniquet is formed by an elongated strap for encircling a human or animal body part and a buckle. The buckle is connected near a first end of the strap and the second end of the strap is configured to be passed through the buckle to form an occluding portion extending from the first strap end to the buckle and surrounding the body part, and a wrapping portion extending from the buckle to the second strap end. The wrapping portion is configured to be wrapped around the body part at least once. At least a portion of the strap is made of an elastic fabric having a surface with fastening features, such as elastic loop fabric, which is configured to engage with complementary fastening features near the second strap end, such as hooks, to fasten the tourniquet.

19 Claims, 3 Drawing Sheets

(56) References Cited

U.S. PATENT DOCUMENTS

| | | | |
|---|---|---|---|
| 4,149,540 A | | 4/1979 | Hasslinger |
| 4,243,028 A | | 1/1981 | Puyana |
| 5,893,870 A | * | 4/1999 | Talen ................. A61B 17/1322 |
| | | | 606/201 |
| 2006/0211976 A1 | | 9/2006 | Ramsey |
| 2010/0057120 A1 | * | 3/2010 | Kirkham ............ A61B 17/1322 |
| | | | 606/203 |
| 2012/0310273 A1 | | 12/2012 | Thorpe |
| 2014/0094731 A1 | | 4/2014 | Serola |
| 2015/0051638 A1 | | 2/2015 | Dickinson et al. |
| 2017/0112503 A1 | | 4/2017 | Brown |
| 2020/0187958 A1 | | 6/2020 | Bagby |
| 2020/0367909 A1 | * | 11/2020 | Rankins, III ....... A61B 17/1325 |
| 2021/0085335 A1 | | 3/2021 | Dahl |
| 2021/0113213 A1 | | 4/2021 | Dahl et al. |

FOREIGN PATENT DOCUMENTS

| | | |
|---|---|---|
| CN | 205433813 U | 8/2016 |
| WO | 92/05741 A1 | 4/1992 |
| WO | 2014/137302 A1 | 9/2014 |
| WO | 2019/054925 A1 | 3/2019 |
| WO | 2020/163826 A1 | 8/2020 |

* cited by examiner

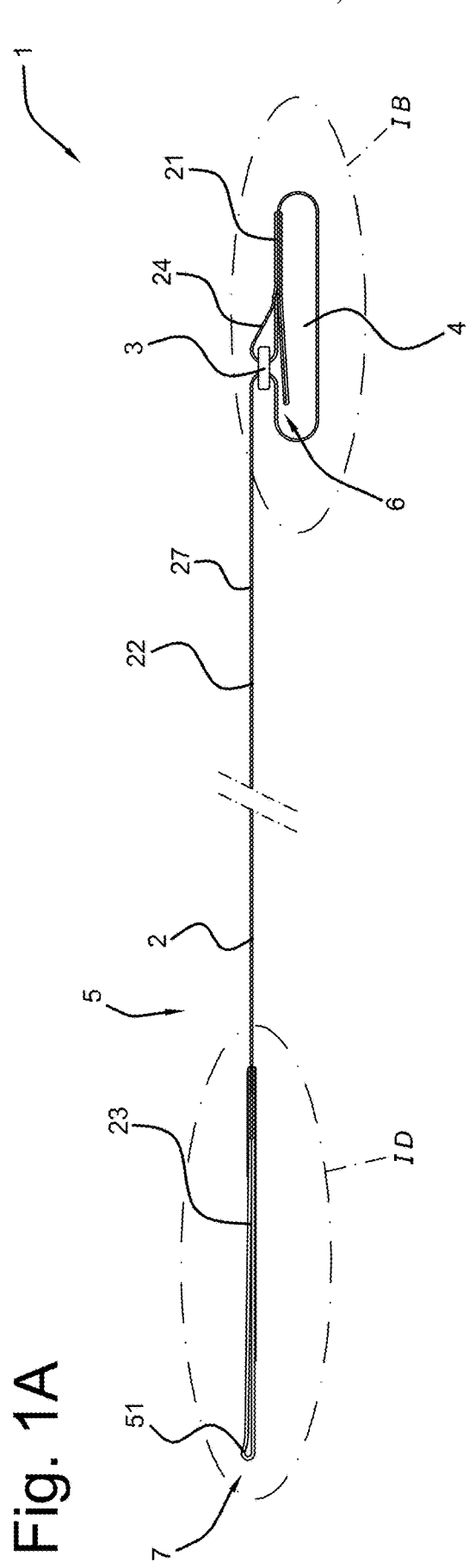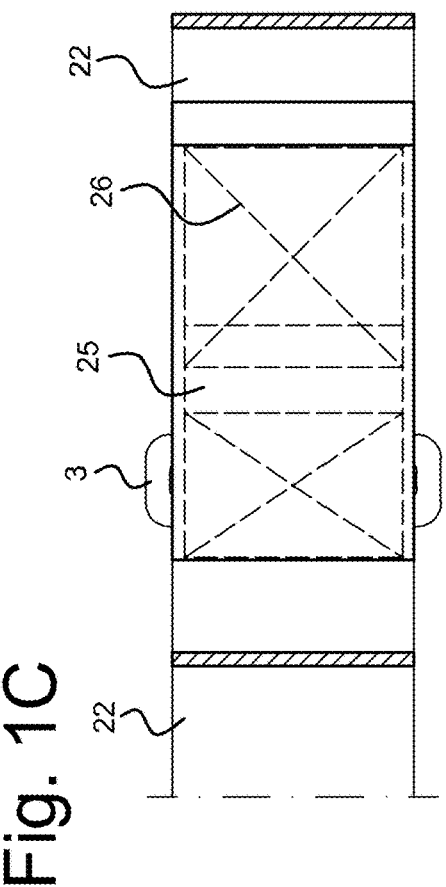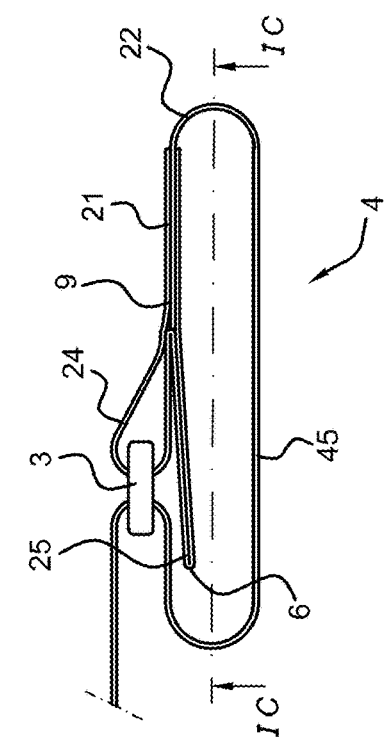

TOURNIQUET AND FIRST AID KIT COMPRISING A TOURNIQUET

TECHNICAL FIELD

The invention relates to a tourniquet and a first aid kit comprising a tourniquet.

BACKGROUND ART

Tourniquets are well known and are for instance used in emergency and/or combat situations as device to stop severe bleeding of a limb of a badly injured person. In many cases, where a dedicated tourniquet is not readily available, a belt, shirt, shoe lace, handkerchief or similar device is used by wrapping the item about the circumference of the injured limb at a location above the wound. The improvised tourniquet is tightened, often with the aid of a stick, pipe or other rigid windlass device, to exert sufficient, uniform cuff pressure on the limb to stop the severe bleeding, including arterial bleed. Although these types of items can prove useful, they can be unreliable if not applied in just the right manner. Moreover, they can become inadvertently loosened or in some cases removed, thereby allowing the bleeding to continue.

Other known tourniquets include those that are constructed as high tech tourniquets that require in depth training, and ultimately, certification to use. An example of such a tourniquet is disclosed in US patent application 2015/0051638 A1. Although useful, such tourniquets can prove difficulties to apply properly, and thus, can lead to improper use, particularly by those that lack the proper training and certification. In addition, many known tourniquets are relatively expensive as a result of mechanisms required for their construction. Finally, they may require quite some space to store as they can include rigid, relatively heavy, bulky member(s) to facilitate stoppage of blood flow, thereby occupying as much space needed to house the rigid member(s).

It would be desirable to provide a tourniquet, which improves on existing tourniquets, specifically in its ease of use.

SUMMARY OF INVENTION

Therefore, according to a first aspect of the invention, there is provided a tourniquet comprising an elongated strap for encircling a human or animal body part and a buckle, wherein the strap comprises a first portion near a first strap end, the buckle being connected to the first portion, a second portion made of elastic fabric comprising a surface with fastening features, and a third portion near a second strap end opposite to the first strap end, the third portion being provided with a surface comprising complementary fastening features configured to engage with the fastening features on the elastic fabric. The second end of the strap is configured to be passed through the buckle to form an occluding portion extending from the first strap end to the buckle and surrounding the body part, and a wrapping portion extending from the buckle to the second strap end, wherein the wrapping portion is configured to be wrapped around the body part at least once.

In this context the term "buckle" is used to indicate any type of device with an elongate slot through which the strap can be passed through to form an occluding portion and a wrapping portion. For example, the buckle may be a ring or a loop having a square, oval, or D-shaped circumference. Suitable commercial buckles are for instance available from ITW Nexus Europe, such as the ITW Nexus Classic DR 50, or the ITW Nexus SQR 50.

The elastic fabric comprising a surface with fastening features and the third portion with a surface having complementary fastening features may for example be part of a hook-and-loop fastening mechanism, also commonly referred to as a Velcro fastener, or a similar type of mechanical fastener. The fastening features and complementary fastening features typically engage with each other when the two surfaces are pressed together.

The second portion of the strap is typically much longer than the first and third portions of the strap. Consequently, the wrapping portion mainly comprises elastic fabric. Elastic fabric stretches easily, is rather flexible and has a good strength. The elastic material allows the tourniquet to be tightened around the body part, without risk of damaging a nerve or the surrounding skin. The elasticity of the fabric ensures that the pressure on the body part is equally distributed across a relatively large surface. The tourniquet can generate a pressure of at least 300 mmHg. This is more than enough to provide an occlusion of the blood vessel.

Specifically advantageous to the use of an elastic material for the tourniquet is that a tight fit around the body part can be maintained. Unfortunately with conventional tourniquets it frequently occurs that a tourniquet is originally applied tightly around a victim's body part, but when minutes to hours after the accident the muscles in the body part relax themselves, the victim starts severely bleeding again. Due to the relaxation of the muscles, the circumference of the body part reduces and with a conventional tourniquet it would be required to increase the tension to ensure that there is sufficient pressure. With an elastic tourniquet this is not needed. The pressure on the body part may reduce a little when the muscle relaxes, but it would still provide sufficient pressure to occlude the artery.

In addition, the tourniquet is easy and intuitive to apply. No special training or instructions are needed to explain its use to a caregiver. This encourages people that pass by an accident to assist and help the victim as they do not need to worry about causing more damage by wrongly applying the tourniquet.

The elastic fabric is preferably provided with fastening features over the full length of the second portion along one of its surfaces. Nevertheless, it will be understood that it is also possible to only provide patches with fastening features along part of the strap. For example, in an embodiment, the elastic fabric may be formed by an elastic tape having small patches of a fabric with a surface with fastening features attached thereto.

In an embodiment, the elastic fabric comprising a surface with fastening features is elastic loop fabric and the complementary fastening features are hooks. The term "elastic loop fabric" is defined as an elastic fabric having at least one surface provided with loops configured to be engaged by hooks of a hook and loop fastener. Currently elastic hook fabric is not yet commercially available, yet it will be understood that if elastic hook fabric would become commercially available in the future, also a tourniquet having a second portion made of elastic hook fabric and a third portion having loops configured to be engaged with the elastic hook fabric would be suitable for use in the tourniquet.

In an embodiment, the first portion has a length between 4 and 15 cm, preferably between 5 and 10 cm. The first portion forms part of the occluding portion in use. Preferably the first portion is short enough for the occluding portion to also comprise a part of the second portion of the strap comprising the elastic loop fabric. The elastic fabric is comfortable and soft in its direct contact with the skin.

In an embodiment, the second portion has a length between 100 cm and 150 cm, preferably around 125 cm. The second portion of the tourniquet typically forms the largest part of the wrapping portion. Since the tourniquet is used as an emergency device, it is typically not tailored specifically to a victim's body posture. Instead, a one size fits all principle is applied, which means the device needs to be suitable both for use on small children as well as large and/or overweight adults. The length of the second portion is selected to enable at least one revolution around a person's body part. Preferably, the length of the second portion is selected to enable at least two or three revolutions around a person's body part. Such revolutions are counted in addition to the first revolution of the strap in the occluding portion. A tourniquet of at least 100 cm should enable one to make at least two revolutions also when applied to large and/or overweight adults.

The revolutions made with the wrapping portion may partially overlap each other, yet alternatively may also be arranged substantially on top of each other. By spreading the revolutions over a larger width than the strap width, the surface across which the pressure is exerted increases. Preferably, the surface with fastening features is provided over the full length of the second portion. When the third portion with the surface with complementary fastening features is engaged to the surface with fastening features, it can be attached to the previous revolution of the wrapped portion and/or the revolution(s) before that. Equally spreading the wrapping portion over a larger surface further distributes the pressure, increasing comfort and preventing nerve damage.

In an embodiment, the third portion has a length between 10 and 20 cm, preferably around 15 cm. The surface with complementary fastening features may extend over the full length of the third portion or may extend along only part of it. In embodiments, the length of the patch comprising hooks is between 5 and 15 cm, preferably around 10 cm. It will be understood that the third portion should not be too long to prevent that they make more than one revolution since the hooks on the third portion need to engage to the surface with fastening features on the second portion.

In an embodiment, the width of the strap is between 4 and 6 cm, preferably around 5 cm. After applying the tourniquet, the pressure is distributed over a relatively large surface. The combination of the relatively large width of the strap and the elasticity of the elastic fabric prevent nerve damage by avoiding that a too high pressure on the tissue can occur. The wrapping portion of the tourniquet can be applied to form partially overlapping revolutions. The total width of the tourniquet preferably is maximum 10 cm.

In an embodiment, the elastic fabric has a strain between 20% and 70% when applied to provide a pressure of at least 250 mmHg, or at least 300 mmHg. Preferably, an average person can easily, without the use of additional tools stretch the elastic fabric to achieve a strain between 20% and 70%. Much more strain is not required nor desirable as it would make application of the tourniquet more difficult. Typically, the same tourniquet is suitable both for use around an arm or around a leg. When applied around a leg, which typically has a larger diameter than an arm, the strap can be wrapped around only two or three times, whereas around an arm it can typically easily be wrapped four of five times. Therefore when wrapped around an arm, the pressure applied by each layer of the wrap is lower and also the strain in the fabric may be lower to achieve the same pressure. Moreover, due to the spread of the pressure over a relatively large surface, nerve damage is prevented.

In an embodiment, the first and/or third portion are made of a non-elastic material, preferably a non-elastic web material. Preferably both the first and the third portion are made of a non-elastic material, for example a nylon webbing. Such material is also typically used in the manufacture of luggage belts and/or backpack straps and is suitable for use in a tourniquet. The non-elastic web material is strong and has low stretch, while at the same time providing the necessary flexibility to be bent around the body part of a victim without providing hard edges that lead to an unpleasant experience when in contact with the skin of the victim.

In an embodiment, the wrapping portion is configured to be wrapped around the body part in a direction opposite to the occluding portion surrounding the body part. The buckle thus turns the winding direction of the strap around. Applying a different winding direction for the wrapping portion enables the caregiver to easily keep tension on the occluding portion of the strap while encircling the body part with the wrapping portion.

In an embodiment, the buckle has only one opening suitable for passing the strap, and wherein the strap is configured to be passed through the opening and folded back onto itself after passing through the opening in the buckle. Alternatively, the buckle may comprise another mechanism that keeps the occluding portion of the strap under tension while wrapping the wrapping portion of the strap around the body part. In such alternative embodiments, a buckle with more than one opening may be provided, or a buckle with a gripping means that prevents a strap that has passed through the buckle from slipping back. For such buckles, the encircling may continue in the same wrapping direction as the direction of the occluding portion. The additional revolutions around the body part will provide a further and equal pressure on the body part.

In an embodiment, the first portion is provided with an engagement loop and the buckle is connected to the first portion using the engagement loop. This is a cheap and easy way to attach the buckle to the first portion.

In a further embodiment, the engagement loop is stitched to the first portion at a distance of at least 1 cm, preferably at least 2 cm from the first end of the strap. Advantageously, the first portion forms a tab that extends on the side of the victim's skin beyond the buckle. The tab avoids that the buckle makes direct contact with the skin. It thereby prevents the buckle from pressing into the skin when the tourniquet is applied. Moreover, it prevents the skin from being pinched by the buckle when the tourniquet is applied.

In an embodiment, the buckle is made of a plastic material. The tourniquet may be stored for several years before it will be first used. A plastic material is safe to use, lightweight, and does not corrode. Preferably, the ring has round-off corners to prevent it from damaging the skin.

In an embodiment, the buckle is a releasable buckle, for example a side release buckle or a buckle comprising a ladderlock. Advantageous to a releasable buckle is that passage of the second end of the strap through the buckle may have already been done prior to applying the tourniquet. The occluding portion is easily formed by fastening the buckle. As such, applying a tourniquet with a releasable buckle can be done faster than a tourniquet with a non-releasable buckle.

In an embodiment, the releasable buckle may comprise a first buckle part fixed adjacent to the first portion of the strap, and a second buckle part that is freely moveable along at least the second portion of the strap. Movability of the second buckle part along the strap may be obtained in several ways. For example, the second buckle part may be provided with two elongate slots spaced at a small distance from each other. The strap is passed through the first elongate slot and back through the second elongate slot.

In an embodiment, the third portion is further provided with gripping means. The gripping means may for example be a pull loop, a hook, or a roughened surface that make it easy to exert a pulling force on the third portion. When the tourniquet is applied, the strap may get wet. It is therefore especially important that the gripping means maintain their gripping capability also when wet.

In an embodiment, the gripping means comprise a pull loop at the second strap end. A pull loop is easy and cheap to manufacture. Moreover, it works intuitively and motivates people to pull the loop and thereby correctly apply the tourniquet. In embodiments, the pull loop is provided with explanatory texts and/or symbol to further explain the use of the tourniquet.

In an embodiment, the tourniquet further comprises a locking mechanism. The strap is fastened by a hook and loop fastening mechanism. Although this fastening mechanism has a negligible risk of accidentally disengaging, it may be easily loosened when pulling the second strap end in an upward direction from the body part. If a patient is in a confused state of mind, this may easily be done. The tourniquet may therefore comprise an additional locking mechanism such as a locking pin, a button, or some sort of clamp that can lock the second strap end at the third portion of the strap to the first or second portion of the strap.

According to a second aspect of the invention, and in accordance with the advantages and effects described herein above, there is provided a first aid kit comprising a tourniquet according to the invention. Currently, a first aid kit typically does not comprise a specialized tourniquet as it would not be clear to the ordinary person how to use it. However, the tourniquet according to the invention does not require an explanation and therefore is ideally suited to be included in regular first aid kits.

In an embodiment, the first aid kit further comprises one or more of the following items: an instruction card, nitrile gloves, a trauma bandage, a resuscitation mask and/or a thermal blanket. Each of these items is useful to assist in emergency situation during the first 15 to 30 minutes. Advantageously, all items are provided together in a compact package.

In an embodiment, the kit is provided in a pouch, preferably a white pouch. Ideally, a first aid kit comprising a tourniquet would be provided in each car since severe bleedings typically occur after traffic incidents. Providing the kit in an easily recognizable pouch makes it quick to locate. Ideally, a first aid kit comprising a tourniquet would be provided in each vehicle and at public locations such as shopping centers, schools, sports clubs, train stations etc.

In a further embodiment, the pouch is provided with an electronically readable code, preferably a QR code. The electronically readable code is preferably readable by a person's smartphone, such as a QR code. A quick scan of code on the pouch redirects a caregiver to a website comprising instruction, preferably in the form of audio and/or video. The instructions will guide the caregiver through not only the steps of how to apply the tourniquet, but also explain the steps to take afterwards.

BRIEF DESCRIPTION OF DRAWINGS

Embodiments will now be described, by way of example only, with reference to the accompanying schematic drawings in which corresponding reference symbols indicate corresponding parts. In the drawings, like numerals designate like elements. Multiple instances of an element may each include separate letters appended to the reference number. For example, two instances of a particular element "20" may be labeled as "20a" and "20b". The reference number may be used without an appended letter (e.g. "20") to generally refer to an unspecified instance or to all instances of that element, while the reference number will include an appended letter (e.g. "20a") to refer to a specific instance of the element.

FIG. 1A schematically shows a side view of a first embodiment of a tourniquet.

FIG. 1B presents a detail of the looped end portion of the tourniquet in FIG. 1A.

FIG. 1C shows a cross-sectional bottom view of part of the tourniquet as indicated in FIG. 1B.

Figure 1D:
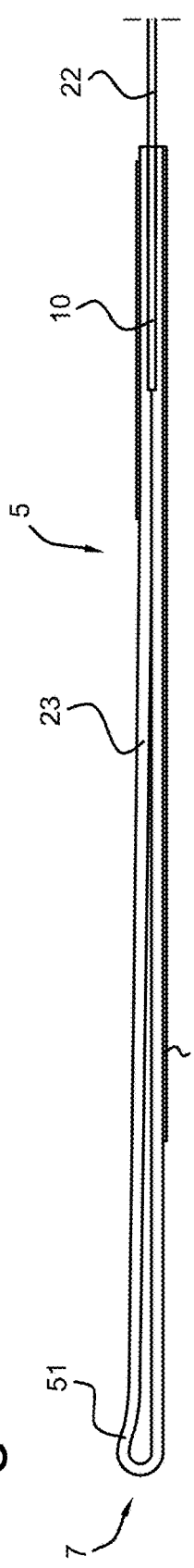
FIG. 1D presents a detail of the free end portion of the tourniquet as indicated in FIG. 1A.

The figures are meant for illustrative purposes only, and do not serve as restriction of the scope or the protection as laid down by the claims.

DESCRIPTION OF EMBODIMENTS

The following is a description of certain embodiments of the invention, given by way of example only and with reference to the figures.

FIG. 1A shows a side view of a first embodiment of a tourniquet 1. The tourniquet 1 comprises a strap 2 and buckle 3. The strap 2 is elongated and has a first portion 21 near a first end 6 with an engagement loop 24, a third portion 23 near a second strap end 7, and a second portion 22 extending between the first portion 21 and third portion 23. The buckle 3 divides the strap 2 into an occluding portion 4 that extends from the first strap end 6 to the buckle 3, and a wrapping portion 5 extending from the buckle 3 to the second strap end 7. It will be understood that the occluding portion 4 and wrapping portion 5 may have a varying size dependent on the position of the strap 2 with respect to the buckle 3.

The buckle 3 is connected to the engagement loop 24 of the first portion 21. To apply the tourniquet 1, the unfolded strap 2 is provided on one side of a persons' body part, for example a leg or arm, and arranged to be encircled and wrapped around the body part. The second strap end 7 is passed through the buckle 3 to form the occluding portion 4 and the wrapping portion 5. The occluding portion 4 is tightened around the body part, and the wrapping portion 5 of the strap is folded back onto the occluding portion 4. The wrapping portion 5 is wrapped tightly around the victim's body part and fastened to apply pressure to the wound.

FIG. 1B shows a detail of the first portion 21 and part of the second portion 22. The first portion 21 is formed by folding and stitching strap material around a proximal second portion end 9. The strap material is folded to form the engagement loop 24 that carries the buckle 3 and thereby connects the buckle 3 to the strap 2. The first portion 21 further has a tab 25 that extends a few centimeters further than the engagement loop 24. The tab 25 thereby prevents that the skin or clothing of a victim can get stuck or damaged in the buckle 3. The engagement loop 24 is stitched to the first portion at a distance of approximately 6 cm from the end of the strap 2 at the first portion 21. The engagement loop 24 approximately has a length of 3 cm and hence the tab 25 extends beyond the engagement loop over a distance of approximately 3 cm. This is enough to ensure that no skin or clothing can get stuck in the buckle 3.

The first portion 21 is made of a non-elastic web material, for example a nylon webbing. Such material is also typically used in the manufacture of luggage belts and/or backpack straps and is suitable for use in the tourniquet 1. The non-elastic web material is strong and has low stretch, yet at the same time provides the necessary flexibility to be bent around the body part of a victim without providing hard edges that lead to an unpleasant experience when in contact with the skin of the victim.

FIG. 1C shows a cross-sectional detail of the strap 2 as indicated in FIG. 1B. The first portion 21 and second portion 22 are connected to each other using stitches 26. The first portion 21 is approximately 9 cm long. Consequently, the occluding portion 4, when the tourniquet is applied on an average adult, comprises not only the first portion 21 but also part of the second portion 22.

The second portion 22 is shown in FIGS. 1A and 1s made of elastic loop fabric. The elastic loop fabric shows a strain of 100% at a force of approximately 30 N/cm width, 200% at a force of approximately 100 N/cm width, and 300% at a force of approximately 400 N/cm width measured according to ISO 13934-1. It will be understood that in different embodiments, the fabric may have a different elasticity. For example, in embodiments, the fabric may show a strain of 100% at a force between 10 N/cm width and 60 N/cm width. It will further be understood that these values may be higher or lower when a different width of the strap is used.

Typically, the elastic loop fabric is not stretched more than 100% during use as the elongation would make the strap difficult to apply. Up to 100% stretch, the elastic fabric stretches approximately linear. Preferably, the strap 2 is stretched while being applied such that it still provides a tight fit once a muscle relaxes and the circumference of a body part reduces. Typically, this is achieved when initially a pressure of at least 300 mmHg is applied. In an example, to apply the tourniquet 1 having a width of 5 cm around an upper leg having a diameter of 20 cm, the elastic loop fabric may be stretched around 40% to achieve a pressure of 300 mmHg when wrapped around the leg twice. The total force that a care giver needs to exert to apply such a strap is typically less than 100 N.

To apply the strap, one simply pulls the third portion 23 or the second end 7 of the strap 2 while encircling the body part, wrapping the body part as tight as he/she can. The elastic loop fabric has at least one surface with loops 27 that defines the exterior circumferential surface of the revolutions formed by the wrap. In the occluding portion 4, the surface with loops 27 is provided along an inner circumferential surface. Since the surface with loops 27 of the elastic loop fabric is soft and does not contain sharp edges, it is very safe and rather comfortable to apply the tourniquet 1.

The second portion 22 is approximately 125 cm long. This length is typically sufficient to enable at least two revolutions around the upper leg of a large adult. Preferably, at least three or four revolutions can be made. The additional revolutions provide extra pressure on the wound and having a larger number of revolutions does not lead to negative effects. This makes the tourniquet 1 also suitable for application around the body parts of small children, where the tourniquet might for instance easily be wrapped around five or six times. The revolutions may be provided substantially on top of each other to form a wrapping with an overall width equal to the single width of the strap. Alternatively, the revolutions may be arranged with a partial overlap. The wrap may have a total width up to approximately 10 centimeters, distributing the pressure over a larger surface. Advantageously, the selected wrapping has little effect on the functionality of the tourniquet 1. It is therefore not possible that a caregiver applies the tourniquet 1 wrongly in a way that would make the situation worse.

The strap 2 has an approximately constant width over its entire length. The strap 2 is approximately 5 cm wide. In comparison to conventional tourniquets 1, this is relatively wide, having as an advantage that the pressure after application of the tourniquet 1 is exerted across a relatively large surface. This avoids that a too high pressure can be applied, which might lead to muscle damage. The tourniquet 1, when applied by a "normal person", e.g., a passerby in a shopping center or the average car driver, generates a pressure of approximately 300 mmHg. This is more than enough pressure to generate an occlusion of a blood vessel.

FIG. 1D shows a detail of the third portion 23. The third portion 23 comprises gripping means 51 shaped as a pull loop. The pull loop is formed by stitching a folded piece of web material around a distal second portion end 10. The third portion 23 further comprises the surface with hooks 11 that enables the third portion 23 to be fixed to the surface with loops 27 of the elastic loop fabric of the second portion 22 of the strap 2. The surface with hooks 11 can have sharp edges but since the skin is protected by a few revolutions of the strap 2, the surface with hooks 11 will not come into direct contact with the skin.

The gripping means 51 allow a caregiver to exert a large pulling force on the tourniquet 1 to tighten the wrap. It will be understood that alternative gripping means 51 may also be included, for example a hook or handle at the second end 7 of the strap, or anti-slip protrusions on one or both sides of the third portion.

The third portion 23 is made of a non-flexible web material like the first portion 21. In addition to the material being strong and flexible, the material keeps maintains a good grip when it gets wet. This is important as in case of a severe blooding, the body part whereto the tourniquet 1 needs to be applied is typically wet.

Figure 1E:
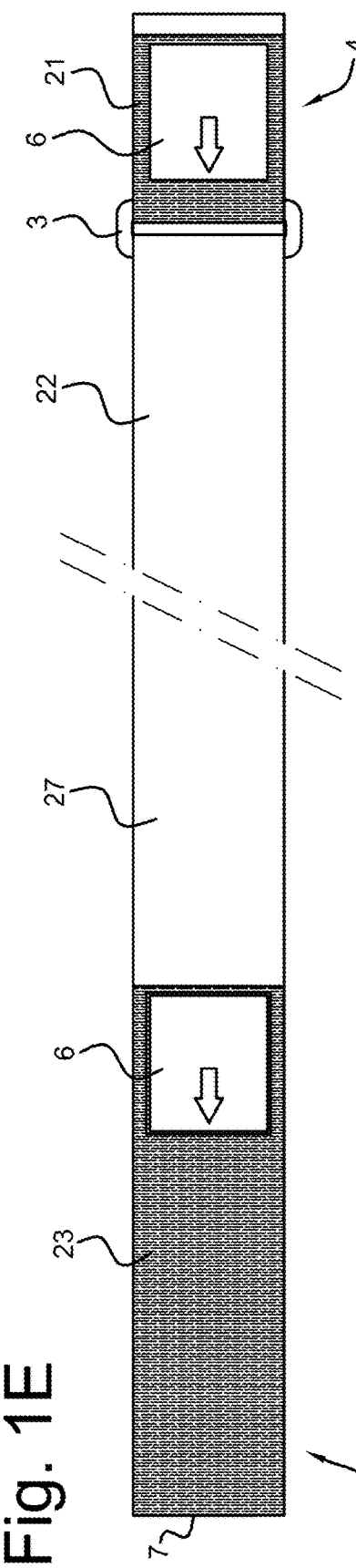
FIG. 1E shows a top view of the tourniquet in FIG. 1A.

FIG. 1E shows a top view of the tourniquet 1 in FIG. 1A. The tourniquet 1 is simple to use and explanatory symbols and/or texts 6 may be stitched or otherwise applied onto the tourniquet 1 to illustrate the correct use of the tourniquet 1. Both on the first portion 21 and third portion 23 explanatory arrows are provided to explain in what direction the tourniquet 1 should be pulled. Nevertheless, even without such indications the tourniquet 1 is simple enough to be understood just on the basis of intuition. This is a large advantage in comparison to currently available tourniquets, since it enables anybody to carry out the emergency care instead of having to wait until a medical professional arrives. It will be understood that if the tourniquet 1 can be applied sooner, typically less blood will be lost increasing the victim's chances of a good recovery.

Figure 1F:
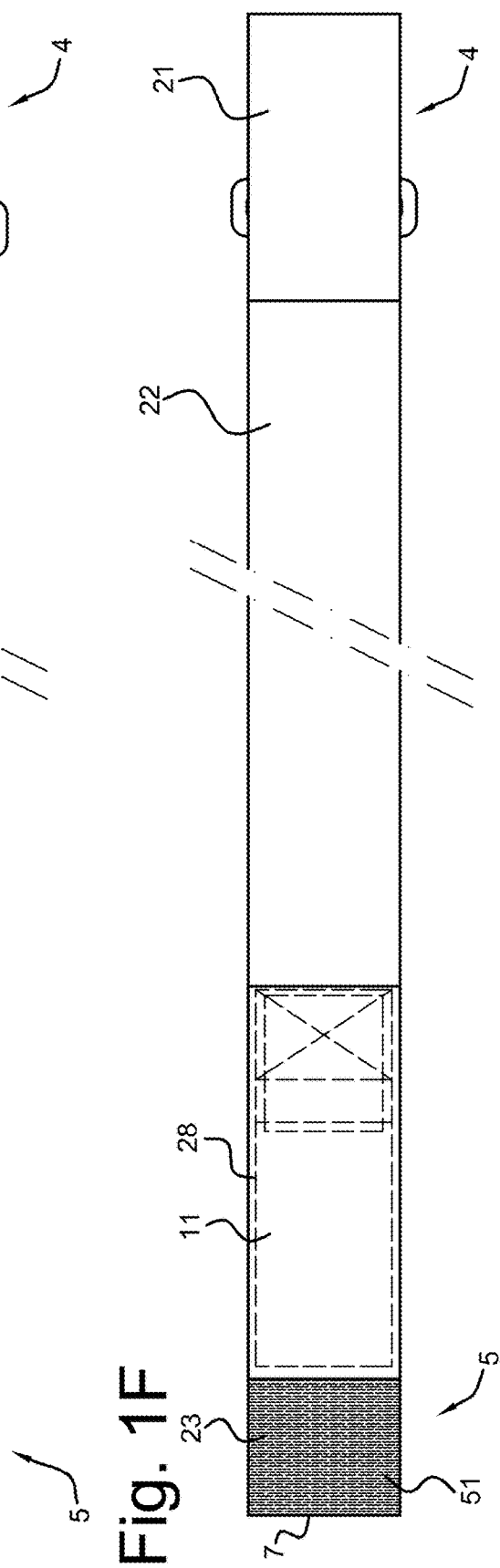
FIG. 1F shows a bottom view of the tourniquet in FIG. 1A.

FIG. 1F shows a bottom view of the tourniquet 1 in FIG. 1A. The surface with hooks 11 is stitched onto the third portion 23 using stitches 28. The surface with hooks 11 extends over a length of approximately 130 mm. The surface with hooks 11 is spaced approximately 45 mm from the second strap end 7. This eases the application of the tourniquet 1 and makes it also quick and easy to remove the tourniquet 1 again when desired. The risk of the tourniquet 1 accidentally loosening is very low since no forces are normally exerted in the direction wherein the tourniquet can be pulled off. The tourniquet 1 is washable and suitable for reuse.

Figure 2:
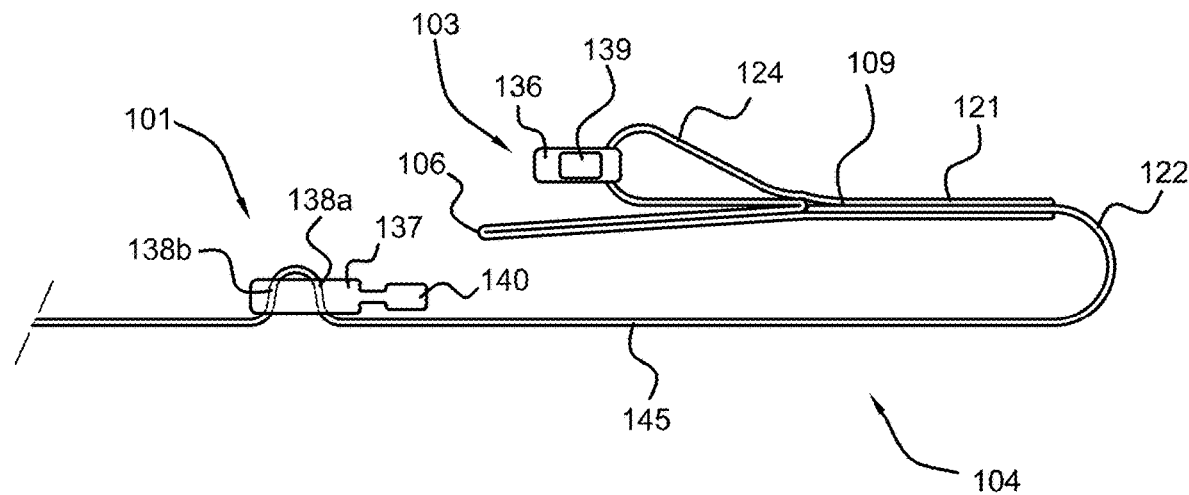
FIG. 2 shows a side view of a detail of a tourniquet according to a second embodiment.

FIG. 2 shows a detail of a tourniquet 101 according to a second embodiment, wherein a releasable buckle 103 is provided. Features that have already been described above with reference to the tourniquet in FIGS. 1A-1F may also be present in this tourniquet 101, and will not all be discussed here again. For the discussion with reference to FIG. 2, like features are designated with similar reference numerals preceded by 100 to distinguish the embodiments.

The releasable buckle 103 comprises a first buckle part 136 and a second buckle part 137. The strap material is folded to form the engagement loop 124 that carries the first buckle part 136. The second buckle part 137 comprises two elongate slots 138a, 138b (schematically indicated) that are spaced at a small distance from each other. The strap is passed through the first elongate slot 138a and back through the second elongate slot 138b in a manner that the second buckle part 137 is freely moveable along the second portion of the strap.

The first buckle part 136 is provided with a cavity 139 that is configured to form a quick release connection with pins 140 extending from the second buckle part 137. This type of buckle is termed a side release buckle, as access to the pins 140 is provided through the cavity 139 in a side of the first buckle part 136. Upon the application of pressure on the sides of the pins 140, the buckle 103 will release itself. It will be understood that alternatively, other types of releasable connections may be applied. Advantageously, a tourniquet with a releasable buckle may be fastened more quickly than a tourniquet with a simpler buckle such as a ring. In the tourniquet 103 according to the second embodiment, the strap may be placed around the body part at an intermediate section 145 between the two buckle parts 136, 137. A loop for the occluding portion 104 around the body part is formed when connecting the buckle parts 136, 137 to each other at an opposing side of the body part. This enables a quick application of the tourniquet 101, without having to guide the entire wrapping portion through the buckle during application.

Figure 3:
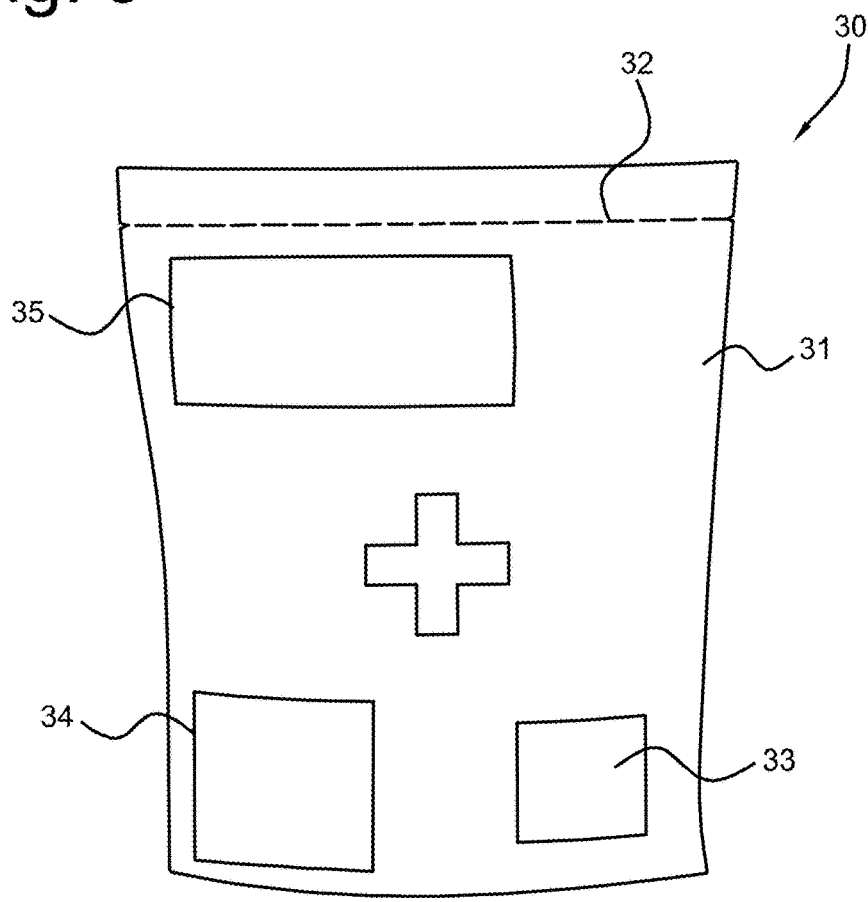
FIG. 3 shows a perspective view of a first aid kid comprising the tourniquet of FIG. 1A-1F.

FIG. 3 shows an embodiment of a first aid kit 30. The contents of the first aid kit 30 are provided in a white pouch 31 having a tear line 32 at the top for easily opening it. On the exterior of the package, a QR-code 33 is provided. Scanning the QR-code 33 with a smartphone leads to a website with instructions on how to use the first aid kit 30. The pouch 31 further comprises a list of contents 34, listing the items that are provided within the pouch 31. The pouch 31 further comprises an indication 35 that it is a First Aid Kit, or Personal Aid Kit, or the like, in the language of the country where it is going to be sold. The first aid kit 30 as depicted comprises an instruction card, nitrile gloves, a tourniquet, a trauma bandage, a resuscitation mask and a thermal blanket. The first aid kit 30 is compact and therefore easy to provide under for instance the driver's seat of a car.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. It will be apparent to the person skilled in the art that alternative and equivalent embodiments of the invention can be conceived and reduced to practice. All changes which come within the meaning and range of equivalency of the claims are to be embraced within their scope.

The invention claimed is:

1. A tourniquet comprising an elongated strap for encircling a human or animal body part and a buckle, wherein the strap has an outer facing surface and comprises
    a first portion near a first strap end, the buckle being connected to the first portion,
    a second portion made of elastic fabric comprising fastening features provided on the outer facing surface, and
    a third portion near a second strap end opposite to the first strap end, the third portion being made of a non-elastic material and being provided with complementary fastening features provided on the outer facing surface, configured to engage with the fastening features on the elastic fabric;
    wherein the second end of the strap is configured to be passed through the buckle to form an occluding portion extending from the first strap end to the buckle, and the occluding portion being configured to surrounding the body part, and
    a wrapping portion extending from the buckle to the second strap end, wherein the wrapping portion is configured to be wrapped around the body part at least once in a direction opposite to the occluding portion that is configured to surround the body part.

2. The tourniquet according to claim 1, wherein the elastic fabric comprising a surface with fastening features is elastic loop fabric and wherein the complementary fastening features are hooks.

3. The tourniquet according to claim 1, wherein the first portion has a length between 4 and 15 cm.

4. The tourniquet according to claim 1, wherein the second portion has a length between 100 cm and 150 cm.

5. The tourniquet according to claim 1, wherein the third portion has a length between 10 and 20 cm.

6. The tourniquet according to claim 1, wherein a width of the strap is between 4 and 6 cm.

7. The tourniquet according to claim 1, wherein the elastic fabric has a strain between 20% and 70% when applied to provide a pressure of at least 250 mmHg.

8. The tourniquet according to claim 1, wherein the first portion is made of a non-elastic material.

9. The tourniquet according to claim 1, wherein the buckle has only one opening suitable for passing the strap, and wherein the strap is configured to be passed through the opening and folded back onto itself after passing through the opening in the buckle.

10. The tourniquet according to claim 1, wherein the buckle is a releasable buckle.

11. The tourniquet according to claim 10, wherein the releasable buckle comprises a first buckle part fixed adjacent to the first portion of the strap, and a second buckle part that is freely moveable along at least the second portion of the strap.

12. The tourniquet according to claim 1, wherein the first portion is provided with an engagement loop and wherein the buckle is connected to the first portion using the engagement loop.

13. The tourniquet according to claim 12, wherein the engagement loop is stitched to the first portion at a distance of at least 1 cm from the first end of the strap.

14. The tourniquet according to claim 1, wherein the buckle is made of a plastic material.

15. The tourniquet according to claim 1, wherein the third portion is further provided with gripping means.

16. The tourniquet according to claim 15, wherein the gripping means comprise a pull loop at the second strap end.

17. The tourniquet according to claim 1, wherein the fastening features are provided over the full length of the second portion.

18. A first aid kit comprising the tourniquet according to claim 1.

19. The first aid kit according to claim 18, further comprising one or more of the following items: an instruction card, nitrile gloves, a trauma bandage, a resuscitation mask and/or a thermal blanket.

\* \* \* \* \*